(12) United States Patent
Kim et al.

(10) Patent No.: US 8,879,039 B2
(45) Date of Patent: Nov. 4, 2014

(54) LIQUID CRYSTAL DISPLAY DEVICE HAVING SECOND METAL PATERN CONNECTED TO PLURALITY OF FIRST METAL PATTERNS THROUGH CONTACT HOLES

(75) Inventors: Lee Young Kim, Seoul (KR); Cheol Woo Park, Goyang-si (KR); Jung Ho Park, Seoul (KR); Hye Jung Lee, Seosan-si (KR); Jong Seuk Kang, Chungji-si (KR); Kyung Ho Lee, Seoul (KR); Hoe Woo Koo, Gumi-si (KR)

(73) Assignee: LG Display Co., Ltd. (KR)

( * ) Notice: Subject to any disclaimer, the term of this patent is extended or adjusted under 35 U.S.C. 154(b) by 223 days.

(21) Appl. No.: 12/953,240

(22) Filed: Nov. 23, 2010

(65) Prior Publication Data

US 2011/0128485 A1    Jun. 2, 2011

(30) Foreign Application Priority Data

Dec. 2, 2009    (KR) .................. 10-2009-0118784

(51) Int. Cl.
   *G02F 1/1345*    (2006.01)
(52) U.S. Cl.
   CPC .......... *G02F 1/1345* (2013.01); *G02F 2202/22* (2013.01); *G02F 1/13458* (2013.01)
   USPC ............ 349/149; 349/150; 349/151; 349/152
(58) Field of Classification Search
   CPC ............ G02F 1/13458; G02F 1/13454; G02F 1/13452; G02F 1/1345

USPC ................................ 349/149, 150, 151, 152
See application file for complete search history.

(56) References Cited

U.S. PATENT DOCUMENTS

| 2001/0032981 | A1* | 10/2001 | Kong et al. | 257/72 |
| 2005/0243234 | A1* | 11/2005 | Jung | 349/43 |
| 2008/0001892 | A1* | 1/2008 | Kim et al. | 345/97 |
| 2008/0122767 | A1* | 5/2008 | Lim et al. | 345/87 |
| 2008/0157364 | A1* | 7/2008 | Yang et al. | 257/741 |

FOREIGN PATENT DOCUMENTS

KR    10-2008-0026850 A    3/2008

* cited by examiner

*Primary Examiner* — Michael Caley
(74) *Attorney, Agent, or Firm* — Birch, Stewart, Kolasch & Birch, LLP

(57) ABSTRACT

An LCD device is disclosed. The LCD device includes a liquid crystal panel configured to include a bonding portion formed in its one edge, pluralities of gate and data lines arranged on it, and pixel regions defined by the gate and data lines. The bonding portion includes: first metal patterns formed away from each other and on a substrate of the liquid crystal panel; a gate insulation film and a protective layer sequentially formed to cover the first metal patterns; and a second metal pattern formed on the protective layer and electrically connected to the first metal patterns partially exposed by contact holes which are formed by partially etching the gate insulation film and protective layer.

6 Claims, 4 Drawing Sheets

LIQUID CRYSTAL DISPLAY DEVICE HAVING SECOND METAL PATERN CONNECTED TO PLURALITY OF FIRST METAL PATTERNS THROUGH CONTACT HOLES

CROSS-REFERENCE TO RELATED APPLICATION

This application claims priority under 35 U.S.C. 119 to Korean Patent Application No 10-2009-0118784 filed on Dec. 2, 2009, which is hereby incorporated by reference in its entirety.

BACKGROUND

1. Field of the Disclosure

This disclosure relates to a liquid crystal display (LCD) device adapted to improve reliability.

2. Description of the Related Art

LCD devices generally control the light transmittance of light crystal using an electric field, in order to display images. To this end, LCD devices each include an LCD panel configured to include liquid crystal cells arranged in a matrix shape, and driving circuits configured to drive the LCD panel.

The LCD panel includes a thin film transistor array substrate and a color filter array substrate combined opposite each other, and spacers configured to maintain a uniform cell gap between the two substrates. The LCD panel further includes a liquid crystal layer interposed between the two substrates.

The thin film transistor array substrate includes pluralities of gate and data lines, thin film transistors formed at each intersection of the gate and data lines, and pixel electrodes formed in the size of a liquid crystal cell and connected to the respective thin film transistors. The gate and data lines receive signals from driver circuits via their respective pad portions. Each of the thin film transistors responds to a scan signal applied from the respective gate line, and transfers a pixel voltage signal applied from the respective data line to the respective pixel electrode.

The color filter array substrate includes color filters, a black matrix, and a common electrode. The color filters are formed in the size of a liquid crystal cell. The black matrix is configured to define the color filters and to reflect external light. The common electrode is configured to commonly apply a reference voltage to the liquid crystal cells.

Such thin film transistor and color filter array substrates are independently manufactured before they are combined with each other. Then, a liquid crystal material is injected between the two combined substrates, thereby providing a completed LCD panel.

The LCD panel still further includes static electricity prevention circuits disposed at both ends of each of the gate and data lines. Each of the static electricity prevention circuits bypasses static electricity induced on the respective data or gate line toward the common electrode which is formed on the color filter array substrate, so the LCD panel is protected from the static electricity.

The static electricity prevention circuits can be ordinarily configured to include either a single diode or three transistors TR with the same size. Also, the static electricity prevention circuits are identically applied to a variety of LCD device models regardless of differences between methods of manufacturing the LCD devices. In other words, the static electricity prevention circuits can not be applied to the LCD device models and the manufacturing methods thereof in an optimized configuration.

Due to this, electrostatic charges can be induced into the LCD panel. The pixels and/or the static electricity prevention circuits on the LCD panel are damaged by the electrostatic charges, and furthermore defected LCD device can be manufactured. Therefore, the reliability of the LCD device deteriorates.

BRIEF SUMMARY

Accordingly, the present embodiments are directed to an LCD device that substantially obviates one or more of problems due to the limitations and disadvantages of the related art.

An object of the present disclosure is to provide an LCD device that is adapted to improve reliability by preventing external static electricity, which can be input into a bonding pad portion, through a modification of the bonding pad portion on one edge of the LCD panel.

Another object of the present disclosure is to provide an LCD device that is adapted to improve reliability by shielding external static electricity, which can be input to signal lines being used to transfer signals from a data printed-circuit-board (PCB) to the gate driver IC (integrated-circuit) chips on an LCD panel of the GIP (gate-in-panel) type, through a modification of the signal lines.

Still another object of the present disclosure is to provide an LCD device that is adapted to improve reliability by preventing external static electricity, which can be input into an LCD panel, through a modification of signal lines on a COF (chip-on-flexible-printed-circuit) film which is connected to a bonding pad portion on the LCD panel.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, an LCD device includes a liquid crystal panel configured to include a bonding portion formed in its one edge, pluralities of gate and data lines arranged on it, and pixel regions defined by the gate and data lines. The bonding portion includes: first metal patterns formed away from each other and on a substrate of the liquid crystal panel; a gate insulation film and a protective layer sequentially formed to cover the first metal patterns; and a second metal pattern formed on the protective layer and electrically connected to the first metal patterns partially exposed by contact holes which are formed by partially etching the gate insulation film and protective layer.

An LCD device according to another aspect of the present embodiment includes: a liquid crystal panel configured to include a bonding portion formed in its one edge, pluralities of gate and data lines arranged on it, and pixel regions defined by the gate and data lines; and a chip-on-flexible printed circuit film attached to the bonding portion and configured to include a plurality of signal lines which are used to transfer signals to the gate and data lines. Each of the signal lines includes: first metal patterns formed away from each other and on a base film; an insulation film formed to cover the first metal patterns; and a second metal pattern formed on the insulation film and electrically connected to the first metal patterns partially exposed by contact holes which are formed by partially etching the insulation film.

An LCD device according to still another aspect of the present embodiment includes: a liquid crystal panel defined into a display area loaded with liquid crystal cells, which are arranged in a matrix shape, and a non-display area; a gate driver disposed at one edge of the non-display area of the liquid crystal panel and configured to drive a plurality of gate lines on the liquid crystal panel; a printed circuit board connected to one edge of the liquid crystal panel and configured to apply driving signals and voltages to the gate driver; a flexible printed circuit board configured to interface the liquid crystal panel and the printed circuit board; and signal lines formed to extend from the printed circuit board to the non-display area of the liquid crystal panel through the flexible printed circuit board and used to transfer the driving signals and voltages to the gate driver. Each of the signal line includes: first metal patterns formed away from each other and on a substrate of the liquid crystal panel; a gate insulation film and a protective layer sequentially formed to cover the first metal patterns; and a second metal pattern formed on the protective layer and electrically connected to the first metal patterns partially exposed by contact holes which are formed by partially etching the gate insulation film and protective layer.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
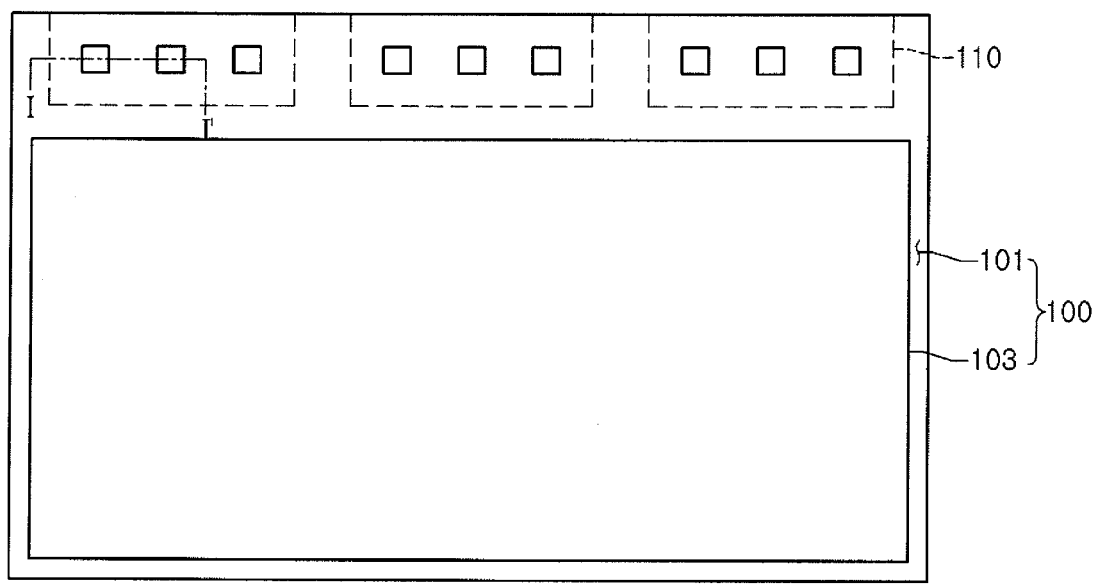
FIG. 1 is a planar view schematically showing an LCD panel with bonding portions.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

FIG. 1 is a planar view schematically showing an LCD panel with bonding portions. Referring to FIG. 1, the LCD panel 100 provided with the bonding portions includes a thin film transistor array substrate 101, a color filter array substrate 103, and a liquid crystal layer (not shown) formed between the two substrates 101 and 103.

The thin film transistor array substrate 101 includes a plurality of gate lines (not shown) arranged at a fixed interval in a vertical direction, a plurality of data lines (not shown) arranged at a fixed interval in a horizontal direction. The pluralities of gate and data lines cross each other and define pixels (not shown) in the thin film transistor array substrate 101. The pixels are arranged in a matrix shape on the thin film transistor array substrate 101.

The color filter array substrate 103 includes red, green, and blue color filters (not shown) formed at positions opposite to the pixels, a black matrix (not shown) formed to rim each of the color filters, and a common electrode (not shown) formed to associate with pixel electrodes (not shown) on the thin film transistor array substrate 101 and to apply electric fields to the liquid crystal layer. The black matrix functions to prevent color interference between lights passing through the color filters.

The bonding portions 110 are arranged in a top edge of the LCD panel 100 and used as regions to which driver IC chips (not shown) are attached. In other words, the bonding portions 110 are formed in a boundary area between the interior and exterior of the LCD panel 100. The bonding portions 110 are connected to a COF film (not shown) through the following process.

Each of the bonding portions 110 includes metal patterns (not shown) which will be electrically connected to signal lines formed on the COF film. The metal patterns are configured to each include first metal patterns (not shown) formed from the same material and in the same layer as the gate line on the LCD panel 100, and a second metal pattern (not shown) formed from the same material as the pixel electrode which is formed in the pixel region of the LCD panel. The first metal patterns can be simultaneously formed when the gate lines are formed on the LCD panel 100. In other words, the first metal patterns can be formed in the same process as the gate lines. The second metal pattern can be simultaneously formed when the pixel electrodes are formed in the pixel regions of the LCD panel 100. Similarly, the second metal pattern can be formed in the same process as the pixel electrode.

Figure 2:
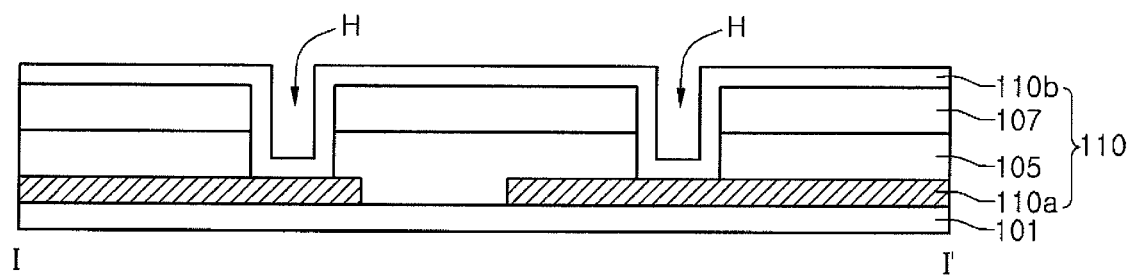
FIG. 2 is a cross-sectional view showing the cross-sectional structure of the bonding portion taken along a line I-I' in FIG. 1.

FIG. 2 is a cross-sectional view showing the cross-sectional structure of the bonding portion taken along a line I-I' in FIG. 1. As shown in FIGS. 1 and 2, each of the bonding portions 110 includes the first metal patterns 110a formed on the thin film transistor array substrate 101, a gate insulation film 105 and a protective (or passivation) layer 107 sequentially formed to cover the first metal patterns 110a, and the second metal pattern 110b formed on the protective layer 105. The second metal pattern 110b is electrically connected to the first metal patterns 110a via an etched portion which is formed by partially etching the protective film 107 and gate insulation film 105.

The first metal patterns 110a are not formed in a single body on an upper surface of the thin film transistor array substrate 101. In other words, the first metal patterns 110a are formed in such a manner so as to be separate from each other by a fixed distance. Such first metal patterns 110a separated from each other by the fixed distance are formed by depositing a metal film on the thin film transistor array substrate 101 and partially exposing the thin film transistor array substrate 101 through an etching process of the metal film. As described above, the first metal patterns 110a are formed from the same material as the gate line on the LCD panel 100.

The gate insulation film 105 and the protective layer 107 are sequentially stacked on the substrate 101 loaded with the first metal patterns 110a. The stacked layers of the gate insulation film 105 and protective layer 107 are partially etched to form contact holes H which partially expose the first metal patterns 110a, respectively.

Subsequently, the second metal pattern 110b is formed on the substrate 101 provided with the contact holes H. The second metal pattern 110b is electrically connected to the first metal patterns 110a through the contact holes H. Also, the second metal 110b is electrically connected to the driver IC chip which is attached to the thin film transistor array substrate 101 together with other driving circuits through the following process. Such a second metal pattern 110b can be formed from the same transparent electrode material as the pixel electrode formed in the pixel region. Alternatively, the second metal pattern 110b can be formed from another metal material such as MoTi, ZnO, or others.

During a manufacturing process, for example, when a driver IC chip is attached to the second metal pattern 110b, static electricity can be induced in the second metal pattern 110b. The static electricity induced in the second metal pattern 110b is input to the first metal patterns 110a which are electrically connected to the second metal pattern 110b. The static electricity input to the first metal patterns 110a is shielded so as not to be transferred inside the LCD panel 100. This results from the fact that the first metal patterns 110a are formed away from each other and electrically disconnected to each other.

In this manner, the LCD device according to the present disclosure allows the first metal patterns 110a of the bonding portion 110 to be formed away from each other. As such, the LCD device can prevent the static electricity induced in the bonding portion 110 from inputting into the LCD panel, even though the static electricity is induced in the bonding portion 110 during its manufacturing processes.

Figure 3:
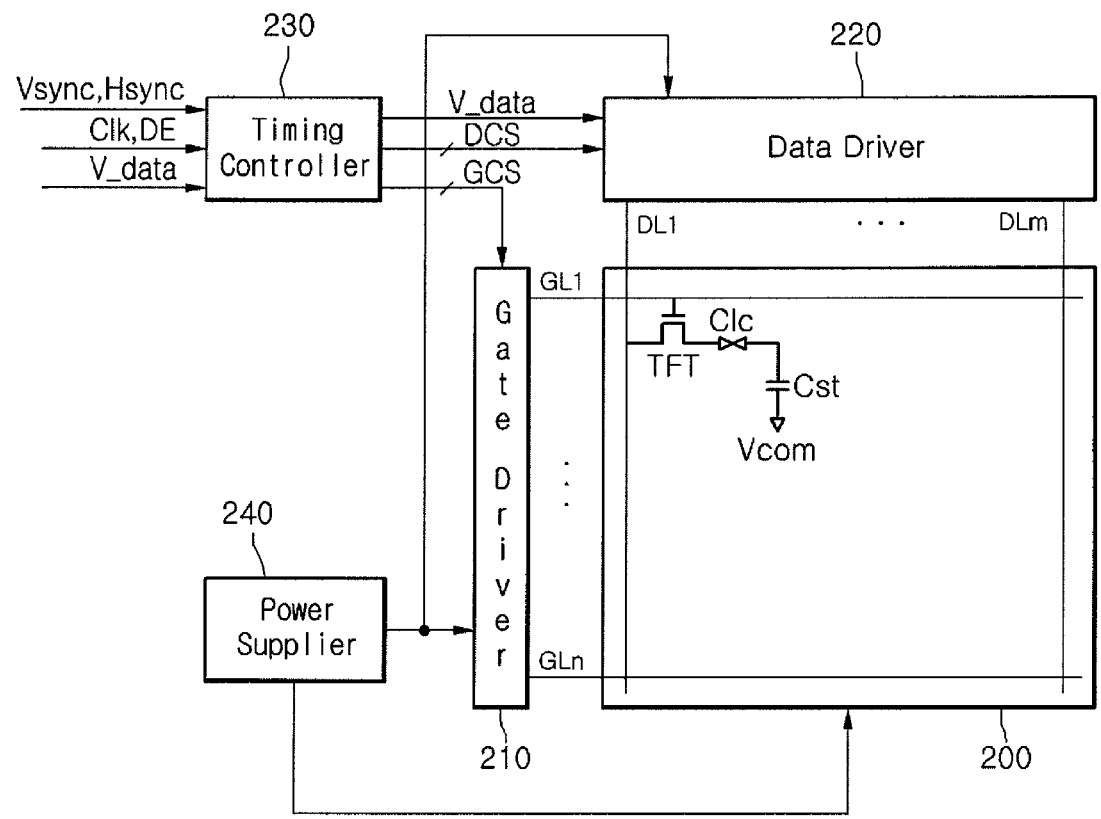
FIG. 3 is a block diagram showing an LCD device according to an embodiment of the present disclosure.

FIG. 3 is a block diagram showing an LCD device according to an embodiment of the present disclosure. As shown in FIG. 3, the LCD device according to the present disclosure includes an LCD panel 200 configured to include thin film transistors TFT which are formed at each intersection between a plurality of gate lines GL1~GLn and a plurality of data lines DL1~DLm and which are used to drive liquid crystal cells Clc, respectively. The LCD device further includes a gate driver 210 configured to sequentially apply scan signals to the gate lines GL1~GLn on the LCD panel 200, a data driver 220 configured to apply pixel data voltages to the data lines DL1~DLm on the LCD panel 200, a timing controller 230 configured to control the gate and data drivers 210 and 220, and a power supplier 240 configured to apply driving voltages to the gate and data drivers 210 and 220.

The LCD panel 200 includes two glass substrates (not shown) and a liquid crystal layer (not shown) interposed between the two substrates.

A lower glass substrate of the two substrates includes the pluralities of gate and data lines GL1~GLn and DL1~DLm formed to cross each other, and the thin film transistors TFT formed at each of the intersections of the gate and data lines GL and DL. Each of the thin film transistors TFT responds to the scan signal on the respective gate line GL and applies the pixel data voltage on the respective data line DL to the respective liquid crystal cell Clc. To this end, each of the thin film transistors TFT includes a gate electrode connected to the respective gate line GL, a source electrode connected to the respective data line DL, and a drain electrode connected to a pixel electrode of the respective liquid crystal cell Clc. The lower glass substrate of the LCD panel 200 further includes storage capacitors Cst formed to each maintain a voltage which is charged into each of the liquid crystal cells Clc.

An upper glass substrate of the LCD panel 200 includes red, green, and blue color filters (not shown) formed opposite respective pixel regions in which the thin film transistors TFT are formed respectively. The upper glass substrate further includes a black matrix (not shown) formed to rim each of the color filters, and a common electrode (not shown) formed to cover the color filter and the black matrix. The black matrix functions to shield the gate lines GL1~GLn, the data lines DL1~DLm, and the thin film transistors TFT.

The gate driver 210 responds to gate control signals GCS from the timing controller 230 and applies the plurality of scan signals to the plurality of gate line GL1~GLn, respectively. The plurality of scan signals makes the plurality of gate lines GL1~GLn to be sequentially enabled in the period of a single horizontal synchronous signal.

The data driver 220 responds to data control signals DCS from the timing controller 230. Also, the data driver 220 generates the plurality of pixel data voltages and applies the plurality of pixel data voltages to the plurality of data lines DL1~DLm on the LCD panel 200, whenever any one of the gate lines GL1~GLn is enabled.

The timing controller 230 receives synchronous signals Vsync and Hsync, a data enable signal DE, and a clock signal CLK from an external system (not shown) such as a graphic module of a computer system, an image demodulator of a television receiver, or others. The timing controller 230 derives the gate and data control signals GCS and DCS from the synchronous signals Vsync and Hsync, data enable signal DE, and clock signal CLK. The gate control signals GCS are used for controlling the gate driver 210. The data control signals DCS are used for controlling the data driver 220. Furthermore, the timing controller 230 re-arranges image data "V_data" applied from the external system and supplies the data driver 220 with the re-arranged image data "V_data".

The power supplier 240 converts an external voltage applied from the external system into the driving voltages necessary to drive the gate and data drivers 210 and 220. The driving voltages are applied to the gate and data drivers 210 and 220, respectively. The power supplier 240 together with the timing controller 230 can be disposed on a PCB (not shown) loaded with the data driver 220.

Figure 4:
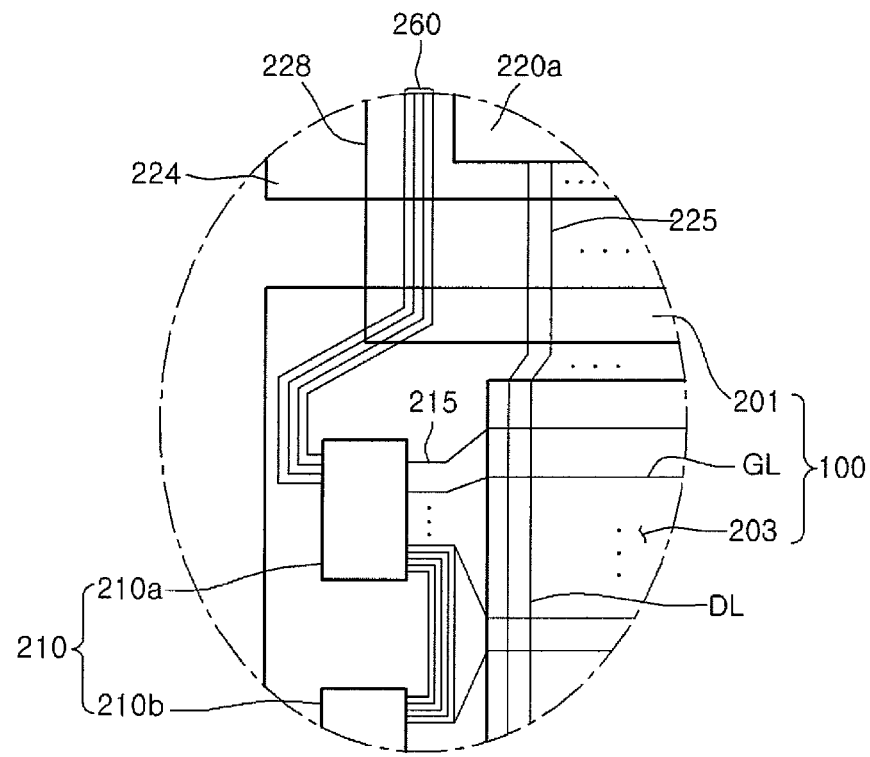
FIG. 4 is an enlarged planar view showing a part of the LCD device of FIG. 3.

FIG. 4 is an enlarged planar view showing a part of the LCD device of FIG. 3. Referring to FIGS. 3 and 4, the LCD device includes the LCD panel 200 in which the pluralities of gate and data lines GL and DL are arranged, data driver IC chips 220a configured to drive the data lines DL, and a PCB 224 disposed by one edge of the LCD panel 200.

The LCD panel 200 includes the thin film transistor array substrate 201, the color filter array substrate 203, and the liquid crystal layer (not shown) interposed between the two substrates 201 and 203. Such an LCD panel 200 is electrically and physically connected to the PCB 224 by means of a flexible printed-circuit (FPC) board (or film) 228. The data driver IC chips 220a form the data driver 220 shown in FIG.

3. The data driver IC chips 220*a* are divisionally connected to their share of the data lines DL on the LCD panel 200. Such data driver IC chips 220*a* are loaded on the PCB 224.

The PCB 224 loaded with the data driver IC chips 220*a* includes a plurality of link lines 225 electrically connected to the plurality of data lines DL. The plurality of link lines 225 are arranged between output terminals of the data driver IC chips 220*a* and the data lines DL of the LCD panel 200. Also, the plurality of link lines 225 are used to electrically connect the output terminals of the data driver IC chips 220*a* with the plurality of data lines DL.

The PCB 224 and FPC board (or film) 228 each include signal lines 260. The signal lines 260 are also formed on one edge of the non-display area of the thin film transistor array substrate 201. The signal lines 260 on the PCB 224, FPC board (or film) 228 and thin film transistor array substrate 201 are electrically connected with one another. In other words, the signal lines are formed to extend from the PCB 224 to one edge of the non-display area of the thin film transistor array substrate 201 via the FPC board (or film) 228. The signal lines 260 formed on one edge of the non-display area of the thin film transistor array substrate 201 are electrically connected to a first gate driver IC chip 210*a*. Furthermore, the signal lines 260 are formed between the first and second gate driver IC chips 210*a* and 210*b*, so that the first and second gate driver IC chips 210*a* and 210*b* are electrically connected to each other.

The signal lines 260 are used for transferring the gate control signals GCS which are generated in the timing controller (230 in FIG. 3) mounted on the PCB 224 and are used to drive the gate driver IC chips 210*a* and 210*b*. Also, the signal lines 260 are used for transferring the driving voltages which are generated in the power supplier 240 mounted on the PCB 224 and which are necessary to drive the gate driver IC chips 210*a* and 210*b*.

Figure 5:
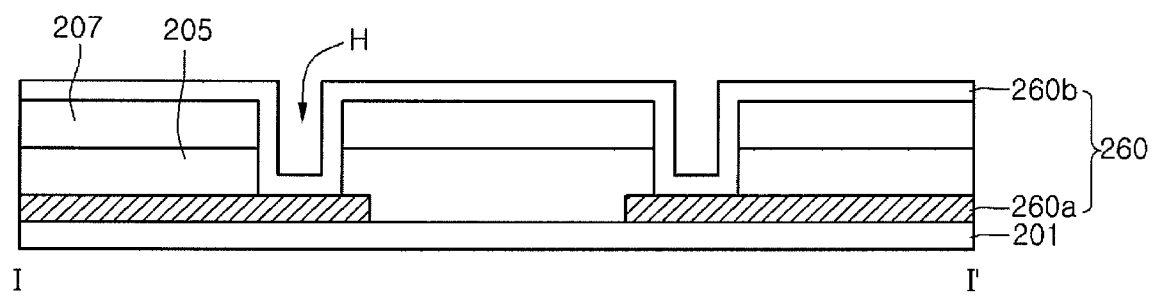
FIG. 5 is a cross-sectional view showing the cross-sectional structure of a signal line on the LCD panel in FIG. 3.

Each of the signal lines 260 on the thin film transistor array substrate 201 includes first metal patterns 260*a* formed from the same material and through the same process as the gate lines GL, and a second metal pattern 260*b* electrically connected to the first metal patterns 260*a*, as shown in FIG. 5. In detail, each signal line 260 on the thin film transistor array substrate 201 includes the first metal patterns 260*a* formed on a substrate 201, a gate insulation film 205 and a protective (or passivation) layer 207 sequentially formed to cover the first metal patterns 260*a*, and the second metal pattern 260*b* formed on the protective layer 207 and electrically connected to the first metal patterns 260*a* via etched portions of the protective layer 207 and gate insulation film 205.

More specifically, the first metal patterns 260 are formed away from each other and separated from each other by a fixed distance. Such first metal patterns 260*a* can be formed by depositing a metal film on the substrate 201 and then exposing desired surface regions of the substrate 201 through a process of etching the deposited metal film. Also, the first metal patterns 260*a* can be formed from the same material, in the same layer, and through the same process as the gate lines GL on the LCD panel 200.

The gate insulation film 205 and the protective layer 207 are sequentially stacked on the substrate 201 provided with the first metal patterns 260*a*. Then, the stacked layers of the gate insulation film 205 and protective layer 207 are partially etched, so as to form contact holes H exposing parts of the first metal patterns 260*a*.

Subsequently, the second metal pattern 260*b* is formed on the substrate 201 in which the contact holes H are formed. The second metal pattern 260*b* is electrically connected to all the first metal patterns 260*a* through the contact holes H. Such a second metal pattern 260*b* can be formed from the same transparent electrode material as the pixel electrode which is formed in the pixel region. Alternatively, the second metal pattern 260*b* can be formed from a metal material such as MoTi, ZnO, or others.

Although it is not shown in the drawings, each of the signal lines 260 on the PCB 224 can be configured to include first metal patterns formed from the same material as the gate lines GL, and a second metal pattern electrically connected to the first metal patterns. More specifically, each signal line 260 on the PCB 224 can include the first metal patterns formed on a bared substrate, an insulation film and a protective layer sequentially formed to cover the first metal patterns, and the second metal pattern formed on the protective layer and electrically connected to the first metal patterns via etched portions of the protective layer and insulation film. The second metal pattern can be formed from a metal material such as MoTi, ZnO, or others. Alternatively, the signal lines 260 on the PCB 224 can be formed in the structure of removing the protective layer between the insulation film and the second metal pattern. In this case, the second metal pattern is formed on the insulation film and electrically connected to the first metal patterns through the contact holes which are formed in the insulation film.

Similarly, each of the signal lines 260 on the FPC board (or film) 228 can be configured to include first metal patterns formed from the same material as the gate lines GL, and a second metal pattern electrically connected to the first metal patterns. More specifically, each signal line 260 on the FPC board (or film) 228 can include the first metal patterns formed on a bared board (or film), an insulation film and a protective layer sequentially formed to cover the first metal patterns, and the second metal pattern formed on the protective layer and electrically connected to the first metal patterns via etched portions of the protective layer and insulation film. The second metal pattern can be formed from a metal material such as MoTi, ZnO, or others. Alternatively, the signal lines 260 on the FPC board (or film) 228 can be formed in the structure of removing the protective layer between the insulation film and the second metal pattern. In this case, the second metal pattern is formed on the insulation film and electrically connected to the first metal patterns through the contact holes which are formed in the insulation film.

If static electricity is induced in the second metal pattern 260*b* which is included in the above signal line 260, the induced static electricity can be input to the first metal patterns 260*a* through second metal pattern 260*b*. However, the static electricity input to the first metal patterns 260*a* is shielded so as not to be transferred inside the LCD panel 200. This results from the fact that the first metal patterns 260*a* are formed away from each other and electrically disconnected to each other.

In other words, the LCD device according to the present disclosure allows the first metal patterns 260*a* of the signal line to be formed away from each other. As such, the LCD device can prevent the static electricity induced in the signal line 260 from inputting into the LCD panel, even though the static electricity is induced in the LOG signal line 260.

Figure 6:
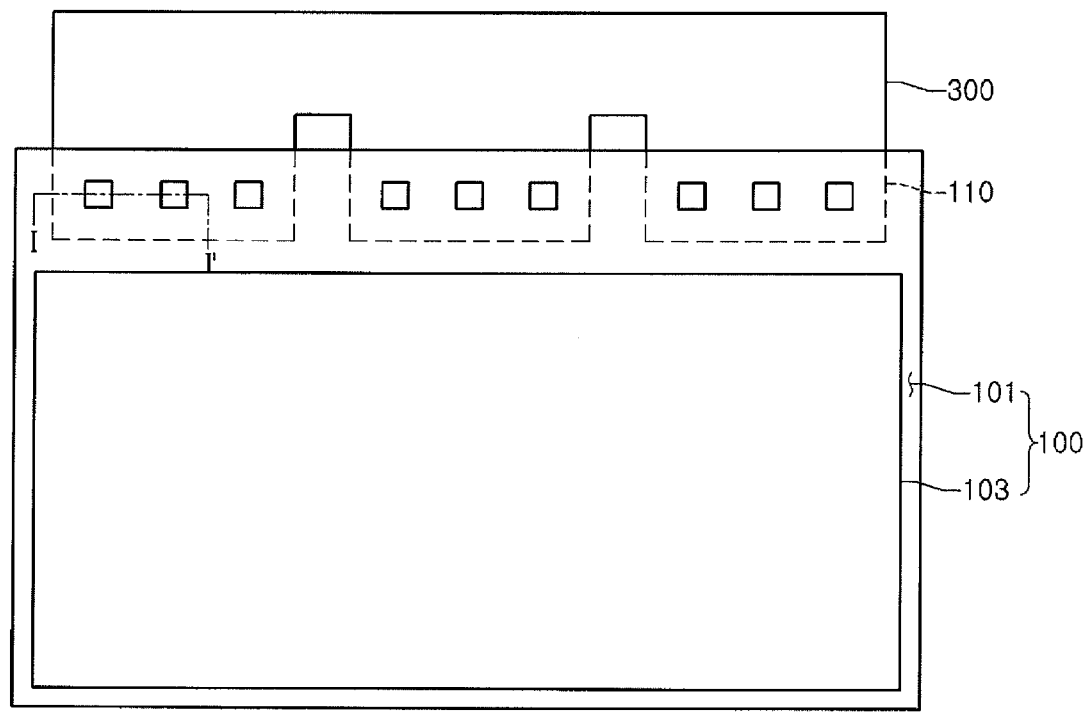
FIG. 6 is a planar view schematically showing a state that a COF film is attached to the LCD panel in FIG. 1.

FIG. 6 is a planar view schematically showing a state that a COF film is attached to the LCD panel in FIG. 1. The LCD panel shown in FIG. 6 is configured in the same manner as that of FIG. 1. As such, for convenience of the explanation, the LCD panel shown in FIG. 6 will be briefly described.

As shown in FIGS. 1 and 6, the LCD device includes a COF film 300 attached to bonding portions 110 which are positioned at the top edge of an LCD panel 100. The COF film 300 includes a plurality of internal signal lines (not shown)

formed to connect a variety of components (not shown) which are loaded on the COF film 300. The COF film 300 further includes a plurality of outlet signal lines formed to connect the variety of components with the bonding portions 110. Such a COF film 300 functions as a PCB configured to generate driving signals, pixel data voltages, and control signals which are necessary to drive gate lines, data lines, and others on the LCD panel 100. As such, the COF film 300 can be applied to small-sized appliances such as a cellular phone or others.

Figure 7:
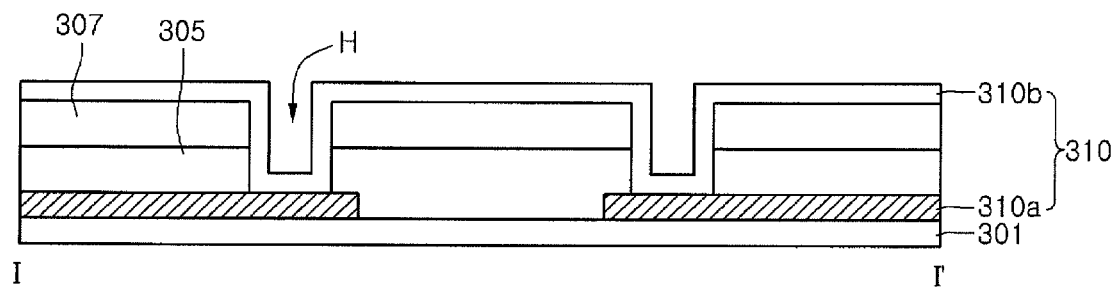
FIG. 7 is a cross-sectional view showing the cross-sectional structure of a signal line on the COF film in FIG. 6.

The outlet signal lines formed on the COF film 300 each include first metal patterns 310a formed from the same material as the gate lines on the LCD panel 100, and a second metal pattern 310b electrically connected to the first metal patterns 310a, as shown in FIG. 7. In detail, each of the outlet signal lines formed on the COF film 300 includes the first metal patterns 310a formed on a base film 301, an insulation film 305 and a protective layer 307 sequentially formed to cover the first metal patterns 310a on the base film 301, and the second metal pattern 310b formed on the protective layer 307 and electrically connected to the first metal patterns 310a.

More specifically, the first metal patterns 310a are formed away from each other and separated from each other by a fixed distance. Such first metal patterns 310a can be formed by depositing a metal film on the base film 301 and then exposing desired surface regions of the base film 301 through a process of etching the deposited metal film. Also, the first metal patterns 310a can be formed from the same material as the gate lines GL on the LCD panel 100.

The insulation film 305 and the protective layer 307 are sequentially stacked on the base film 301 provided with the first metal patterns 310a. Then, the stacked layers of the insulation film 305 and protective layer 307 are partially etched, so as to form contact holes H exposing parts of the first metal patterns 310a.

Thereafter, the second metal pattern 310b is formed on the base film 301 in which the contact holes H are formed. The second metal pattern 310b is electrically connected to all the first metal patterns 310a through the contact holes H. Such a second metal pattern 310b can be formed from a metal material such as MoTi, ZnO, or others.

Alternatively, the outlet signal lines 310 on the COF film 300 can be formed in the structure of removing the protective layer 307 between the insulation film 305 and the second metal pattern 310b. In this case, the second metal pattern 310b is formed on the insulation film 305 and electrically connected to the first metal patterns 310a through the contact holes H which are formed in the insulation film 305.

When the LCD device is manufactured, static electricity can be induced in the second metal pattern 310b of the COF film 300 due to external circumstances. Also, the static electricity induced in the second metal pattern 310b must be input to the first metal patterns 310a which are electrically connected to the second metal pattern 310b. However, the static electricity input to the first metal patterns 310a is shielded so as not to be transferred inside the LCD panel 100. This results from the fact that the first metal patterns 310a are formed away from each other and electrically disconnected to each other.

In this way, the LCD device according to the present disclosure allows the first metal patterns 310a of the COF film 300 to be formed away from each other. As such, the LCD device can prevent the static electricity induced in the COF film from inputting to the bonding portion 110 and the inside of the LCD panel, even though the static electricity is induced in the COF film 300 during the processes of manufacturing the LCD device.

As described above, the LCD device according to the present disclosure forces the bonding pad portion positioned at inner boundary area of the LCD panel adjacent to the exterior, the LOG signal line positioned on another inner area of the LCD panel adjacent to the exterior, or the COF film connected to the bonding pad portion and position at an external boundary area of the LCD panel, to be formed in a modified structure. Therefore, the LCD device can prevent static electricity caused by external circumstances from inputting to the inside of the LCD panel, and furthermore improve the reliability.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid crystal display device comprising:
a liquid crystal panel including pluralities of bonding portions formed in its one edge, pluralities of gate and data lines arranged on the liquid crystal panel, and pixel regions defined by the gate and data lines, one of the bonding portions including:
first metal patterns formed away from each other and on a thin film transistor array substrate of the liquid crystal panel;
a gate insulation film and a protective layer sequentially formed to cover the first metal patterns; and
a second metal pattern formed on the protective layer and electrically connected to the first metal patterns partially exposed by contact holes which are formed by partially etching the gate insulation film and protective layer, the second metal pattern being_in contact with an entire surface of the first metal patterns exposed by the contact holes, and a portion of the second metal Pattern in contact with the first metal patterns exposed by the contact holes having a flat upper surface,
wherein the second metal pattern is electrically connected to a plurality of the first metal patterns through the contact holes,
wherein the bonding portions are used as regions to which driver IC chips are attached, and the second metal pattern is electrically connected to a representative driver IC chip which is attached to the thin film transistor array substrate together with other driving circuits, and
wherein the bonding portions are arranged only in a top edge of the liquid crystal panel.

2. The liquid crystal display device claimed as claim 1, wherein the first metal patterns are formed from the same material as the gate lines and away from each other by stacking a gate line material film on the thin film transistor array substrate and exposing desired regions of the thin film transistor array substrate through a process of etching the gate line material film.

3. The liquid crystal display device claimed as claim 1, wherein the second metal pattern is formed from one of the same transparent material as pixel electrodes, which are formed in the pixel regions, MoTi.

4. The liquid crystal display device claimed as claim 1, wherein the first metal patterns are formed in the same layer with the gate lines.

5. The liquid crystal display device claimed as claim 1, wherein each of the bonding portions are electrically connected to signal lines formed on a Chip-on-Flexible-Printed-Circuit (COF) film.

6. A liquid crystal display device comprising:

a liquid crystal panel configured to include pluralities of bonding portions formed in its one edge, pluralities of gate and data lines arranged on the liquid crystal panel, and pixel regions defined by the gate and data lines; and a chip-on-flexible printed circuit film attached to one of the bonding portions and configured to include a plurality of signal lines which are used to transfer signals to the gate and data lines, each of the signal lines including:

first metal patterns formed away from each other and on a base film;

an insulation film formed to cover the first metal patterns; and a second metal pattern formed on the insulation film and electrically connected to the first metal patterns partially exposed by contact holes which are formed by partially etching the insulation film, the second metal pattern being in contact with an entire surface of the first metal patterns exposed by the contact holes, and a portion of the second metal pattern in contact with the first metal patterns exposed by the contact holes having a flat upper surface, wherein the second metal pattern is electrically connected to a plurality of the first metal patterns through the contact holes, wherein the second metal pattern is formed from the same width as the protective layer, and wherein the bonding portions are arranged in a only top edge of the liquid crystal panel.

* * * * *